H. S. DICKINSON.
LISTER PLOW OR PLANTER.
APPLICATION FILED MAR. 23, 1918.

1,318,979.

Patented Oct. 14, 1919.
4 SHEETS—SHEET 1.

INVENTOR
H. S. Dickinson
BY
Rogers, Kennedy & Campbell
ATTORNEYS.

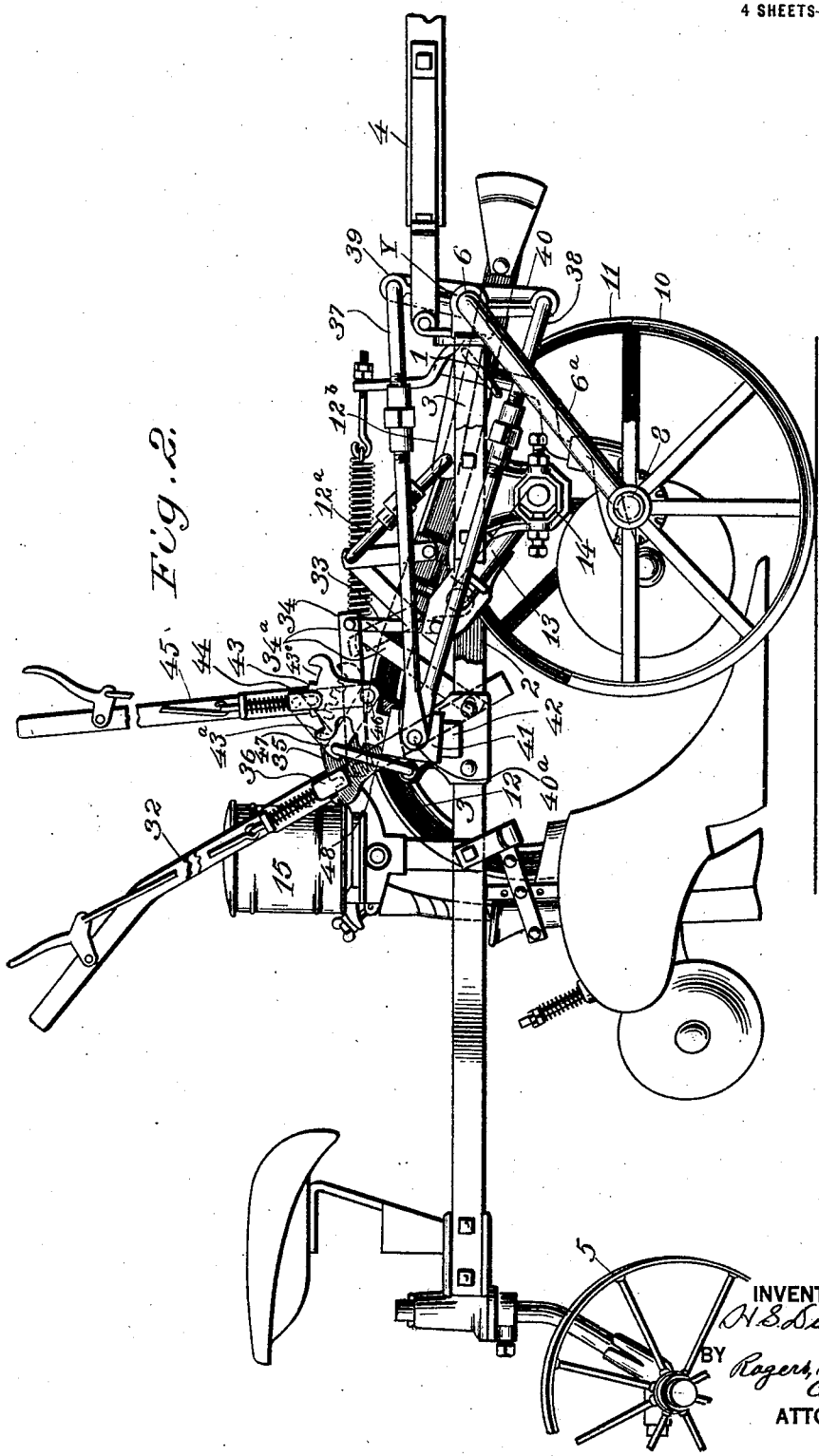

H. S. DICKINSON.
LISTER PLOW OR PLANTER.
APPLICATION FILED MAR. 23, 1918.
1,318,979.
Patented Oct. 14, 1919.
4 SHEETS—SHEET 3.
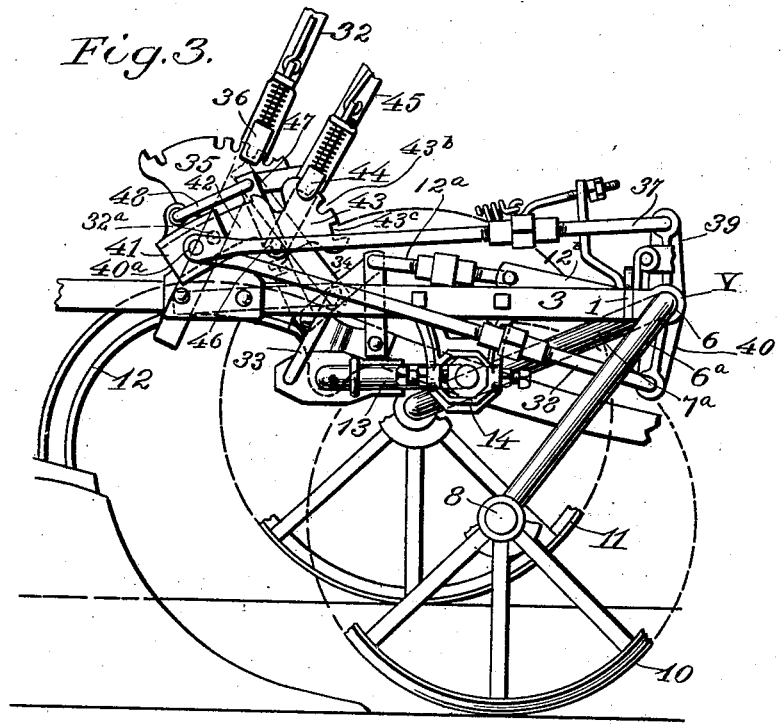
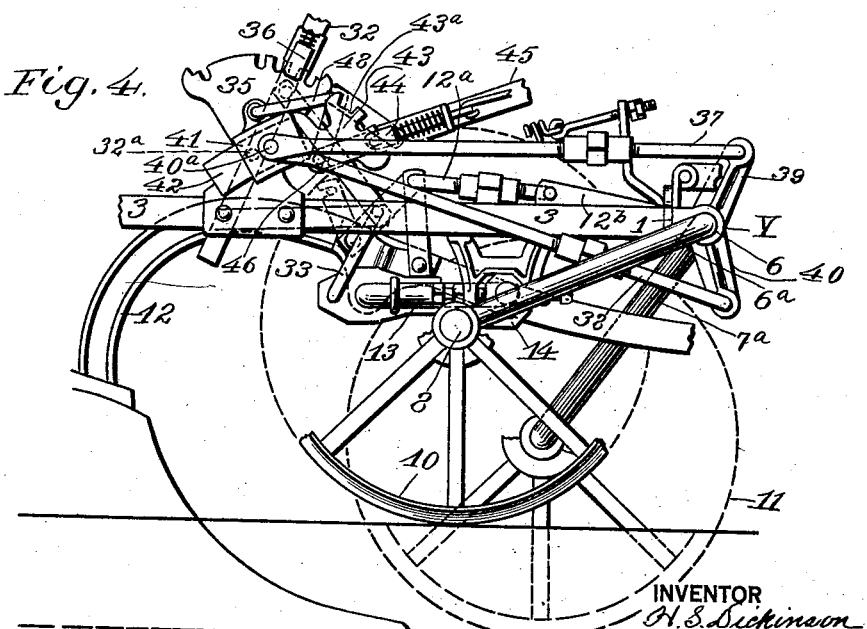
INVENTOR
H. S. Dickinson
BY
Rogers, Kennedy Campbell
ATTORNEYS.

H. S. DICKINSON.
LISTER PLOW OR PLANTER.
APPLICATION FILED MAR. 23, 1918.
1,318,979.
Patented Oct. 14, 1919.
4 SHEETS—SHEET 4.
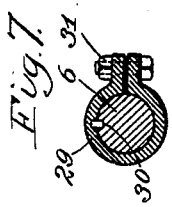
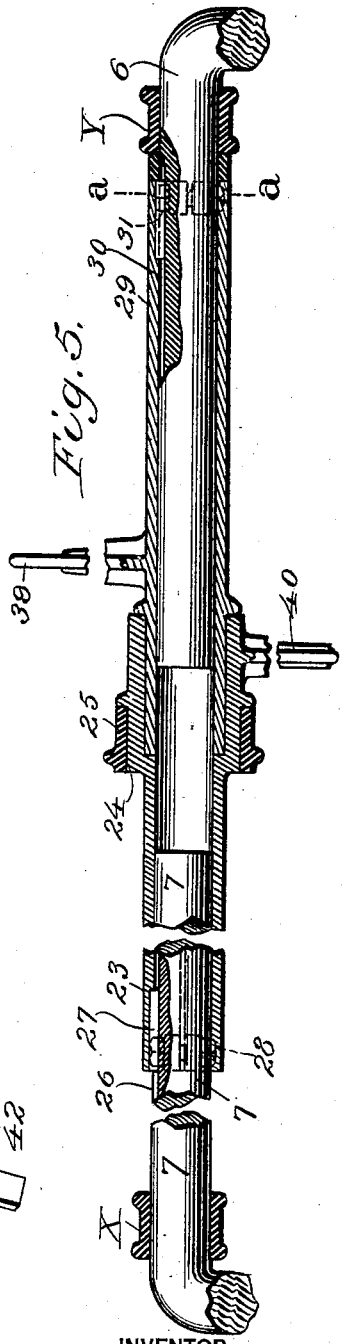
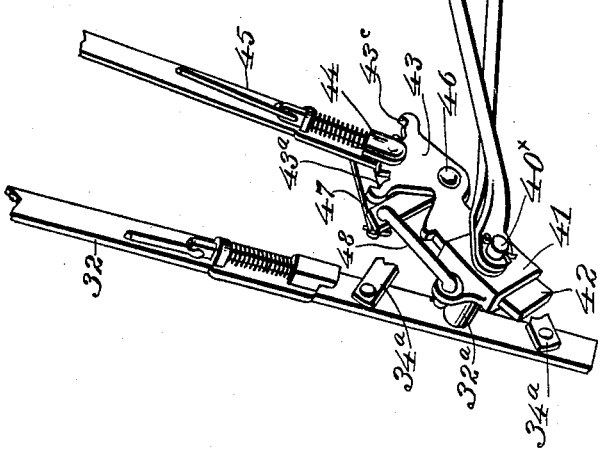
INVENTOR
H. S. Dickinson
BY
Rogers, Kennedy & Campbell
ATTORNEYS.

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

LISTER PLOW OR PLANTER.

1,318,979.  Specification of Letters Patent.  Patented Oct. 14, 1919.

Application filed March 23, 1918. Serial No. 224,133.

*To all whom it may concern:*

Be it known that I, HARRY S. DICKINSON, a citizen of the United States, residing at Moline, in the county of Rock Island and State of Illinois, have invented certain new and useful Improvements in Lister Plows or Planters, of which the following is a specification, reference being had therein to the accompanying drawing.

This invention relates to seed planting machines and has reference more particularly to seed planters of the lister type comprising a wheeled frame equipped with a furrow opener, usually in the form of a double moldboard plow, and with a seed discharging mechanism which operates to discharge the seed in the furrow formed by the furrow opener.

It has been proposed, in order to form the furrows at uniform distances apart, to arrange the ground wheels so that in the successive trips across the field they will alternately run in the furrow last formed and on the land, the said wheels for this purpose being movable up and down in opposite directions and being temporarily held with one wheel raised to travel on the land and the other wheel lowered to travel in the furrow for one trip, and then reversed in position for the return trip. In this way the wheel traveling in the last furrow made will automatically guide the machine accurately, and without the exercise of any skill or care on the part of the driver, and the succeeding furrows will be formed in exact parallelism and at equally spaced intervals.

In turning the machine at the end of a furrow for the return trip, it is of course necessary to raise the plow to permit the turn to be made, and after the machine is turned, the wheels are adjusted so that the wheel which before traveled in the furrow will travel on the land, and the wheel which before traveled on the land will travel in the furrow, and finally the plow is again lowered into action.

The aim of my invention is to provide an adjusting and controlling mechanism of simple and efficient form, by means of which the driver, by the manipulation of a single operating lever may simultaneously effect the movements of the plow and ground wheels, and with this end in view my invention consists in combining with a plow beam movable up and down, ground wheel supports provided with ground wheels and movable up and down in opposite directions, a lever mechanism operatively connected both with the plow beam and wheel supports and operating when actuated to raise the plow, to adjust the wheel supports to a common level for turning or transportation, and when actuated to lower the plow, to move the wheel supports in opposite directions, raising one wheel and lowering the other; whereby the wheels will occupy different levels—one to travel on the land and the other in the furrow.

The invention consists also in combining with the operating lever and wheel supports, a controlling or selecting device operable to control the relative movements of the ground wheel supports by the operating lever.

The invention consists further in improved means for mounting the wheel supports to admit of their adjustment to vary the spread or distance between the wheels.

In the accompanying drawings:

Fig. 2 is a side elevation of the same with the plow beam raised and the ground wheels adjusted to a common level.

Fig. 3 is a side elevation of the rear portion of the frame showing the plow lowered into action, with one of the ground wheels raised and the other lowered.

Fig. 4 is a similar view showing the wheels adjusted to positions opposite those shown in Fig. 3.

Fig. 5 is a sectional view on an enlarged scale of the inner adjacent ends of the two axles on which the ground wheels are mounted.

Fig. 6 is a perspective view of the operating lever and its connections with the axles.

Fig. 7 is a transverse section through one of the axles and its encircling sleeve, said section being taken on the line *a—a* of Fig. 5.

Figure 1:
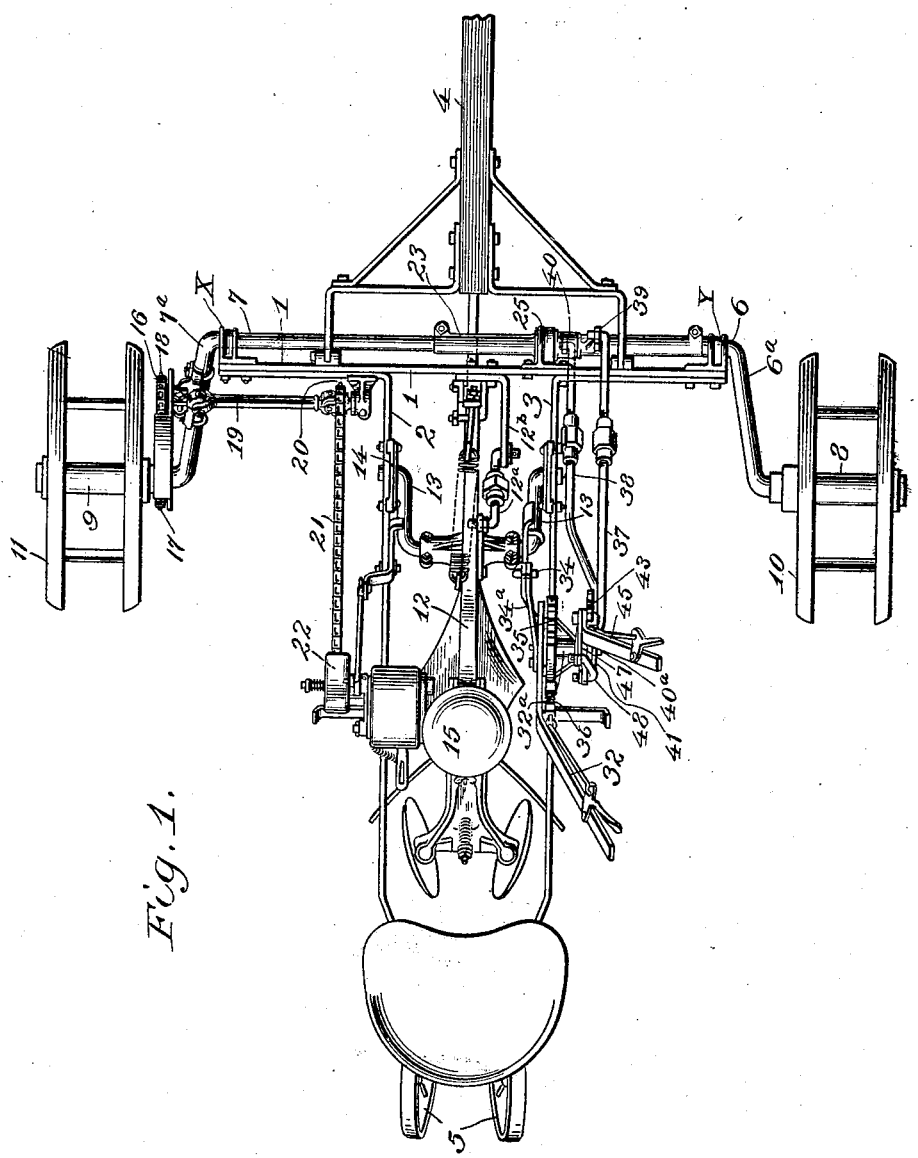
Figure 1 is a top plan view of a lister planter having my invention embodied therein.

Referring to the drawings:

The frame of the machine comprises in the present instance a front frame bar 1 and two rearwardly extending frame bars 2 and 3 connected fixedly at their forward ends to the front frame bar, a draft tongue 4 being connected to the front of the frame, and covering wheels 5 being connected with the rear of the frame in longitudinal alinement with the center of the same.

Mounted in the frame in transverse alinement with each other, are two wheel axles 6 and 7, the outer ends of which are formed with crank arms $6^a$ and $7^a$ provided with ground wheel supports in the form of wheel spindles 8 and 9, ground wheels 10 and 11 being rotatably mounted on said spindles and being spaced apart equal distances from the longitudinal center of the machine and giving support to the frame. 12 designates a centrally arranged fore and aft extending plow beam provided, in the present instance, with a furrow opener in the form of a double moldboard plow. The beam is pivoted to a swinging bail 13 journaled at its ends in bearings 14—14 fixed to the respective longitudinal frame bars, the construction being such that by swinging the bail up and down, the beam will be correspondingly raised and lowered and the plow elevated out of and lowered into action, the level of the beam in these movements being maintained by means of a link $12^a$ pivoted at its rear end to an upward extension of the beam and pivoted at its front end to a bracket arm 12 on the machine frame.

A seed discharging mechanism 15 is sustained by the frame so that in the advance of the machine the seed will be deposited in the furrow. This seed discharging mechanism in the present instance is driven from the ground wheel 11 through a train of gearing comprising a sprocket chain 16 passing over a sprocket wheel 17 on the hub of the ground wheel and over a sprocket wheel 18 mounted in bearings on the axle arm $7^a$; a transverse inwardly extending transmission rod 19 connected at its outer end by a thimble joint with the hub of the sprocket wheel 18 and connected at its inner end by a thimble joint with the hub of a sprocket wheel 20 mounted in bearings on the front frame bar 1; and a sprocket chain 21 passing over said sprocket wheel 20 and over a sprocket wheel 22 on the driving shaft (not shown) of the seed discharging mechanism. Other forms of driving connections for the seed discharging mechanism may be employed without departing from the limits of my invention, that shown being merely by way of example and being of a form which best lends itself to the relative movement of the plow beam and ground wheels.

As shown more particularly in Figs. 1 and 5 the axle 7 is mounted near its outer end in a bearing X on the frame bar 2 and extends at its inner end into a sleeve 23 which is enlarged at its inner end as at 24 where it is mounted to rock in a bearing 25 on the front side of the frame bar 1, the said axle being provided with a key-way 26 which receives a spline 27 on the sleeve. At its outer end the sleeve is split and provided with a clamping bolt 28 by which it may be held firmly and fixedly on the axle, this construction permitting the axle to be adjusted inwardly and outwardly within the sleeve, while at the same time the axle is compelled to move with the sleeve in the rocking motions of the latter in its bearings, so as to swing the ground wheel 11 up or down according to the direction in which the sleeve is rocked.

The other axle 6 is mounted in a bearing Y on the frame bar 3 and extends into a sleeve 29, the inner end of which is mounted to rock in the enlarged end of the sleeve 23, this axle, like the other, being provided with a key-way 30 in which extends a spline on the sleeve. At its outer end the sleeve is split and provided with a clamping bolt 31, as shown in Fig. 7, by means of which the sleeve may be clamped fixedly and firmly to the axle, by which arrangement the axle will be compelled to move with the sleeve in the rocking motions of the latter and thereby swing the ground wheel 10 up and down, while at the same time the axle may be adjusted inwardly and outwardly within the sleeve similar to the adjustment of the other axle. By this means the spread or distance between the wheels may be varied to accommodate rows of different widths.

As a result of the construction described, the two axles are rotatably sustained by the frame in such manner that they can be rocked independently relatively to each other, the purpose of this construction being to permit the wheels on the cranked ends of the axles to occupy different positions relatively to each other, either at a common level when the machine is to be turned or transported or in "opening up" the field, or one wheel raised and the other lowered when the machine is in action with one wheel traveling in the furrow and the other on the land.

These movements of the axles and wheels are controlled and effected by means of a lever mechanism in the form of an operating hand lever 32 which is pivoted near its lower end as at $32^a$ to the frame bar 3, and which is so operatively connected with the two axles and with the plow beam, that when the lever is actuated to raise the plow out of action, the axles will be rocked and the ground wheels brought to a common level, and when the lever is actuated to lower the plow into action, the axles will be rocked relatively to each other in opposite directions and one of the wheels will be elevated and the other lowered; or by certain adjustments of the parts to be described later on in detail, the actuation of the lever to lower the plow will not affect the position of the wheels at a common level.

The connection from the hand lever to the plow beam to raise and lower the same, consists of a link 33 pivoted at its lower end to the bail 13 and pivoted at its upper end to an arm 34 projecting forwardly from the lever and comprising two straps 34ª connected at their rear ends to the lever and connected together at their forward ends by the link 33, the arrangement being such that when the hand lever is swung to a rearward position, as shown in Fig. 2, the bail will be swung upwardly and the plow beam raised, and when the lever is pushed forwardly, the plow beam will be lowered. A toothed segment frame 35 is fixed to the frame bar 3 and is adapted to be engaged by a latch 36 on the lever, whereby the lever may be locked in its forward and rearward positions to maintain the plow beam in lowered and elevated positions respectively.

The connection of the hand lever with the wheel axles to effect the relative movements of the same as above mentioned, comprises upper and lower links 37 and 38. The link 37 is pivoted at its forward end to an arm 39 fixed to and extending radially from the inner end of sleeve 29, this construction constituting in effect a crank arm on the inner end of the axle 6. The link 38 is pivoted at its forward end to an arm 40 fixed to and extending radially from the inner enlarged end of sleeve 23, this construction constituting in effect a crank arm on the inner end of the axle 7. These links converge toward each other and have their rear ends pivoted on a stud 40ª on a slide or block 41 mounted on an arcuate arm 42 fixed to the side of the hand lever and extending in opposite directions from the axis of the lever, as shown in Fig. 6. The arm 42 has formed on its upper end a segment plate 43 containing three notches 43ª, 43ᵇ and 43ᶜ in which is adapted to engage a latch 44 carried by an adjusting lever 45 which is pivoted at its lower end as at 46 at the base of the segment plate. The lever is provided at its lower end with a rearwardly extending arm 47 which is connected by means of a link 48 with the slide 41. As a result of this construction, the slide may be adjusted by the lever along the arcuate arm from one side of its axis to the other and may be locked in the three different positions thereon as determined by the engagement of the locking latch in the respective notches.

The relation of the operating hand lever, plow beam, axles, and the intermediate connections between the axles and lever 32 are such that when the lever is in a rearward position, as shown in Fig. 2, with the adjusting slide 41 in an intermediate or neutral position on the arcuate arm, the crank arms 6ª and 7ª on the outer ends of the axles will be in alinement with each other, and the ground wheels will be at a common level, the plow beam being in this position elevated with the plow out of action, and the arm 42 extending in an arc whose center is coincident with the axis of rocking motion of the axles. If with the parts in this position, the operating lever 32 is pushed forwardly, the plow beam will be lowered and the plow caused to enter the ground, the position of the axles, however, not being disturbed and the ground wheels remaining at the same level due to the fact that the stud 40ª to which the rear ends of the links 37 and 38 are pivoted, is coincident with the axis of the hand lever. The machine is now in position for "opening up" the field, that is with both wheels at the same level and with the plow lowered. With the parts in the position shown in Fig. 2, if the slide 41 is moved upwardly on the arcuate arm to its upper position, which action may be effected by pushing the adjusting lever 45 forwardly and locking the same in the notch 43ᶜ, and the operating lever then swung forwardly to lower the plow, as shown in Fig. 4, the upper end of the arcuate arm swinging forwardly, will carry the slide forward with it and the links 37 and 38 will be thrust forwardly, with the result that the crank arms 39 and 40 on the inner ends of the axles will be swung forwardly, and the axles turned in opposite directions. This will raise ground wheel 10 and will lower ground wheel 11, so that as the machine advances with the plow down in action, the elevated wheel will travel on the land and the lowered wheel will travel in the furrow. If on the other hand, the adjusting slide is moved from the position shown in Fig. 2 downwardly on the arcuate arm to its lower position thereon, and then the operating lever swung forwardly to lower the plow as before, the lower end of the arcuate arm will be swung to the rear, as shown in Fig. 3, and carrying the adjusting slide with it, the links 37 and 38 will be drawn rearwardly, this action turning the two axles in a direction opposite to that just described, with the result that ground wheel 10 will be lowered and ground wheel 11 raised, so that in the travel of the machine with the plow down in action, the two wheels will be reversed from the first position described and wheel 10 will travel in the furrow and wheel 11 on the land.

The movement of the hand lever 32 rearwardly to raise the plow, when the adjusting slide is either in the position shown in Fig. 3 or that shown in Fig. 4, will turn the axles and bring their cranked outer ends into alinement, thereby moving the wheels to a common level.

In the operation of the machine, assuming that it has traveled across the field and one furrow has been formed and planted, with the adjusting slide in its upper position on the arcuate arm and with the ground wheel 10 elevated and the other ground wheel lowered, as shown in Fig. 4, when the end of the furrow is reached and the machine is to be turned for the next furrow, the driver pulls the operating lever to the rear to elevate the plow, which action will rotate the axles from the position shown in Fig. 4 and bring the wheels to a common level. The machine is now turned and during or after the turn is made, the operator moves the adjusting slide from its upper position on the arcuate arm to its lower position as shown in Fig. 3 and then swings the operating lever forwardly, this latter action lowering the plow into action and swinging the axles in opposite directions to lower the wheel 10 and raise the wheel 11, so that in the return trip for the next furrow, the lowered wheel will travel in the furrow just made and the other wheel will travel on the land. When now the end of the second furrow is reached the foregoing operations are repeated, the plow being first raised to bring the wheels to a common level for the turning, the adjusting slide moved to its upper position again and finally the operating lever swung forwardly to lower the beam, by which action the position of the wheels will be again reversed.

It is seen, therefore, that by the single operating lever, in connection with the movement of the adjusting slide 41 first from one side of the axis of the arcuate arm to the other, the driver is enabled to move the wheels to a common level automatically when the beam is raised, so that the turn of the machine may be made, and to automatically adjust the wheels to opposite positions when the beam is lowered.

It will be observed that by the use of the adjusting lever 45, which acts to shift the block 41 on the arcuate arm 42 to one or the other side of the axis of the operating lever, the relative motions of the ground wheels effected by the manipulation of the operating lever, may be controlled. In other words the adjusting lever and the sliding block constitutes in effect a controlling or selecting device which is operable to control the relative movement of the ground wheel supports by the operating lever, one position of the block on the arm causing one of the ground wheels to be lowered and the other raised when the operating lever is pushed forwardly to lower the plow; and another position of the block on the arm causing the first mentioned wheel to be lowered and the other raised when the operating lever is pushed forwardly to lower the plow, and an intermediate position of the block on the arm permitting the operating lever to be manipulated without affecting the positions of the ground wheels.

This intermediate position of the block, effected by moving the adjusting lever to its central position on the segment plate and locking the same in the central notch 43ᵇ therein, adjusts the axis of the links 37 and 38 to a position coincident with the axis of the operating lever so that when the operating lever is shifted, no motion is imparted to the links and consequently the ground wheels are unaffected. This adjustment of the block is resorted to, as before explained, in "opening up" the field, the ground wheels in this operation being sustained at the same level and the plow beam being lowered to cause the plow to enter the ground.

In the foregoing description and accompanying drawings I have set forth my invention in the particular detailed form and construction which I prefer to adopt, but it will be manifest that the invention is not limited to the particular details and embodiment shown as they may be variously changed without departing from the spirit of the invention. Further, it will be understood that the invention is not limited to any particular form or construction of the parts except in so far as such limitations are specified in the claims.

Having thus described my invention, what I claim is:

1. In combination with a frame, a plow beam support mounted thereon and movable up and down relatively thereto, a plow beam carried by the support, wheel supports independent of the plow beam support mounted on the frame and movable up and down relatively to the same respectively in opposite directions to each other, ground wheels carried by said wheel supports, an operating device movably sustained by the frame for controlling the movement of both the plow beam support and the wheel supports, a connection between the operating device and plow beam support, adapted in the movements of the operating device to raise and lower the plow beam support, and other connections between the operating device and wheel supports, adapted when the operating device is actuated to lower the plow beam, to move the wheel supports relatively to each other in opposite directions.

2. In combination with a frame, a plow beam support mounted thereon and movable up and down relatively thereto, a plow beam carried by the support and provided with a plow, wheel supports independent of the plow wheel support mounted on the frame and movable up and down in opposite directions relatively to each other, ground wheels carried by said wheel supports, an operating device movably mounted on the frame for controlling both the plow beam support and the wheel supports, a connection between the operating device and plow beam support for raising and lowering the plow, and a connection between the operating device and wheel supports so arranged that when the operating device is moved to raise the plow, the wheel supports will be moved from different levels to the same level.

3. In combination with a frame, a plow beam sustained thereby and movable up and down, wheel supports mounted on the frame and movable up and down relatively to each other in opposite directions, ground wheels on said supports, an operating device sustained by the frame and operatively connected with the plow beam for raising the same, and connections between the operating device and wheel supports, said connections comprising a selecting device for controlling the movements of the wheel supports by the operating device.

4. In combination with a frame, a plow beam, a support for the beam sustained by the frame and movable up and down, wheel supports independent of the beam support and mounted on the frame, ground wheels mounted on said wheel supports, the said wheel supports being movable up and down in opposite directions, means mounted on the frame and operatively connected with the plow beam to raise and lower the same, and means controlled by the first mentioned means for automatically moving the wheel supports in unison with the plow beam.

5. In combination with a frame, a plow beam support movable up and down thereon, a plow beam carried by the support, wheel supports independent of the plow beam support mounted on the frame and provided with ground wheels, said wheel supports being movable up and down and relatively to the frame in opposite directions, an operating lever mounted on the frame for controlling both the movements of the beam support and wheel supports, said lever being operatively connected with the plow beam to raise and lower the same, and connections between the lever and wheel supports adapted to move the latter in unison with the movement of the plow beam.

6. In combination with a frame, two wheel supports mounted on the frame, ground wheels mounted on the respective wheel supports, said wheel supports being movable relatively to each other up and down, a rockable member sustained by the frame member, a device adjustable on said member from one side of its axis to the other, and connections between said device and the respective wheel supports to move the same relatively to each other in opposite directions.

7. In combination with a frame two wheel supports mounted on the frame, ground wheels mounted on the respective wheel supports, said wheel supports being movable up and down relatively to each other, a hand lever pivoted to the frame, a rocking member movable with the hand lever about the axis of the same, a device adjustable on said member from one side of its axis to the other, and connections between said device and the respective wheel supports.

8. In combination with a frame, a plow beam sustained thereby, and movable up and down, two wheel supports mounted on the frame and movable up and down relatively to each other, ground wheels mounted on the respective supports, a hand lever pivoted to the frame and operatively connected with the plow beam for raising and lowering the same, and provided with a rocking member, a device adjustable on said member from one side of its axis to the other, and connections between said device and the respective wheel supports.

9. In combination with a frame, two wheel supports mounted thereon and movable up and down relatively to each other, ground wheels mounted on the respective supports, a plow beam sustained by the frame to move up and down relatively thereto, a hand lever pivoted to the frame and connected with the plow beam for raising and lowering the same, a rocking member carried by the hand lever and movable therewith about the axis of the lever, a device adjustable on said member to opposite sides of its axis, and connections between said device and the respective wheel supports.

10. In combination with a frame, two axles mounted therein, ground wheels mounted respectively on said axles, said axles being rockable relatively to each other to carry the ground wheels up and down in opposite directions, crank arms on the axles, a rocking member sustained by the frame, means for rocking it on its axis, a device adjustable on said member to opposite sides of its axis, and links connecting the device with the respective crank arms.

11. In combination with a frame, a plow beam mounted thereon and movable up and down, two axles mounted therein, ground wheels on the respective axles, said axles being rockable relatively to each other to carry the ground wheels up and down in opposite directions, a hand lever pivoted to the frame and operatively connected with the plow beam to raise and lower the same, said hand lever provided with a rocking member movable with the lever about the axis of the same, a device on the rocking member adjustable to opposite sides of the axis of the same, crank arms on the respective axles, and links connecting the adjusting device with the respective crank arms.

12. In combination with a frame, a plow beam mounted thereon and movable up and down, two relatively rotatable alined axles mounted therein and provided on their outer ends with cranked wheel spindles, ground wheels mounted on said spindles, crank arms on the inner ends of the axles, a hand lever pivoted to the frame and connected to the plow beam, a rocking member movable with the lever about the axis of the same, a device adjustable on the member to opposite sides of its axis, and links connecting the adjusting device with the crank arms.

13. In combination with a frame, a plow beam, a support for the same sustained by the frame and movable up and down, wheel supports independent of the beam support and mounted on the frame and movable up and down in opposite directions, a lever mechanism sustained by the frame, and operative connections between the lever mechanism and both the plow beam and wheel supports, said connections being of such form that when the lever is operated to raise the plow beam, the wheel support will be moved from different levels to a common level.

14. In combination with a frame, a plow beam, a support for the same sustained by the frame and movable up and down, wheel supports independent of the beam support and mounted on the frame and movable up and down in opposite directions, a lever mechanism sustained by the frame, and operative connections between the lever mechanism and both the plow beam and wheel supports, said connections being of such form that when the lever is operated to lower the beam one wheel will be raised and the other lowered.

15. In combination with a frame, a plow beam, a support for the same sustained by the frame and movable up and down, wheel supports independent of the beam support and mounted on the frame and movable up and down in opposite directions, a lever sustained by the frame, and operative connections between the lever and both the plow beam and wheel supports, said connections being of such form that when the lever is operated to raise the plow beam the wheel supports will be moved to a common level, and when the lever is operated to lower the plow beam, one wheel support will be raised and the other will be lowered.

16. In combination with a frame, two sleeves mounted in bearings thereon and rockable relatively to each other, axles extending at their inner ends within the respective sleeves and rockable therewith, ground wheels mounted on the respective axles and movable up and down in the rocking motion of the sleeves, and means for adjusting the axles within the sleeves to and from each other to vary the spread of the wheels.

17. In combination with a frame, a plow support mounted on the frame to move up and down relatively thereto, a plow carried by the support and movable up and down with it, wheel supports independent of the plow support, said wheel supports being mounted on the frame to move up and down relatively in opposite directions, ground wheels on said wheel supports, an operating lever mounted on the frame and operatively connected with the plow, and connections between the lever and wheel supports independent of the operative connection between the lever and the plow.

In testimony whereof, I have affixed my signature hereto.

HARRY S. DICKINSON.

Copies of this patent may be obtained for five cents each, by addressing the "Commissioner of Patents, Washington, D. C."